June 30, 1942.          C. ELLIS          2,288,395
CRACKING WITH WATER SOLUBLE CATALYST
Filed Aug. 12, 1938
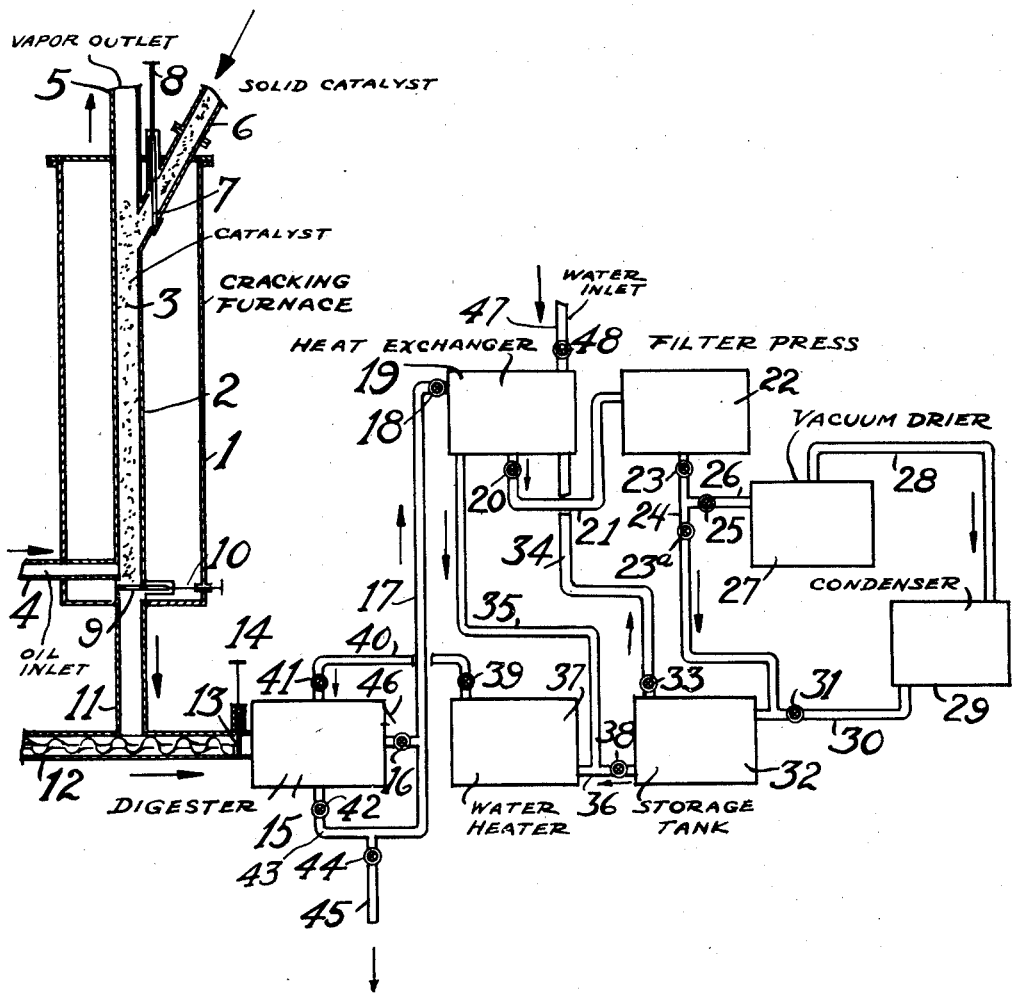
Carleton Ellis Inventor
By J.C. Small Attorney Patented June 30, 1942

2,288,395

UNITED STATES PATENT OFFICE 2,288,395

CRACKING WITH WATER SOLUBLE CATALYST

Carleton Ellis, Montclair, N. J., assignor to Standard Oil Development Company, a corporation of Delaware Application August 12, 1938, Serial No. 224,494

1 Claim. (Cl. 196—52)

This invention relates to the cracking of petroleum hydrocarbons in the presence of water-soluble catalysts. It also involves the use of water-soluble catalysts which yield a small proportion of water at or near the critical point so that both oil and water are subjected, when in intimate contact, to a cracking temperature. Preferably, the catalyst, in addition to being water-soluble, is one which is in motion.

The catalysts suitable for my purpose are preferably inorganic salts which are stable when heated to cracking temperatures and which (at the latter temperatures) effect a cracking and isomerization of the hydrocarbon molecules, leading to an enhanced octane or antiknock value of the gasoline so produced. Such salts may be anhydrous, or substantially so, and should not exhibit to any considerable extent deleterious or undesirable reactions with the hydrocarbon vapors undergoing pyrolysis. Furthermore, such contact agents after use in cracking operations may be regenerated and/or reactivated by dissolving in water and recrystallizing therefrom. Examples of substances which are suitable for my purpose are potassium or lithium sulphate.

In some instances it may be desirable to conduct simultaneously oil molecules and water molecules over the catalytic material maintained at cracking temperatures. This may be accomplished either by commingling a small proportion of water with the hydrocarbon liquid, or by introducing the requisite quantity of steam into the hydrocarbon vapors before the latter enter the reaction or cracking zone, or by any other convenient means. Water, or steam, employed in this manner, particularly in small proportions, is often effective in bringing about isomerization or cracking of the oil molecules to furnish a gasoline of enhanced octane or antiknock value.

Water-soluble hydrated salts, particularly those which in massive or compact forms or shapes do not appear to lose all their water of crystallization at ordinary temperatures or on mild heating but do slowly lose some of it at cracking temperatures, are also applicable for my invention. Examples of such salts are sodium pyrophosphate ($Na_4P_2O_7 \cdot 10H_2O$), sodium tungstate ($Na_2WO_4 \cdot 2H_2O$), sodium pyrovanadate ($Na_2V_2O_7 \cdot 2H_2O$), sodium molybdate ($Na_2MoO_4 \cdot 2H_2O$)

and cerium sulphate ($Ce_2(SO_4)_3 \cdot 8H_2O$). In some instances alums of the ferric or aluminum sulphate type may serve. These latter compounds contain a very large proportion of water of crystallization, so that at least a partial dehydration is required before they are employed as contact materials. Otherwise, the catalytic mass may become liquid at a temperature far below that at which cracking is effected and thus completely obstruct the cracking zone or otherwise interfere with smooth and efficient operation.

I do not wish to imply, however, that hydrated salts or salts which normally occur as hydrates can be employed only in that form. Although with some types of distillates or petroleum fractions they are admirably suitable as catalysts, nevertheless in other instances they may be partially or completely dehydrated before use as contact agents. Also, if desired, a small proportion of water or steam may be admixed with the hydrocarbons undergoing pyrolysis in the presence of hydrated salts.

It is important that the dehydrated or partially dehydrated salts, as well as the hydrated salts, should exhibit melting points considerably above the temperature at which pyrolysis of the hydrocarbon molecules is effected. Otherwise, melting or fusing of hydrated or of anhydrous or substantially anhydrous salts may result in some instances in inefficient or adverse operations. It is also necessary that the contact agents should be non-volatile and stable at cracking temperatures. By the term stable I mean that thermal decomposition (other than loss of water of hydration) or disintegration of the salt molecules into other compounds or into the chemical elements which go to make up their composition does not occur. Furthermore, the contact agents should not undergo an undesirable degree of hydrolysis when in contact with hot or cold water. Examples of salts which are unsuitable for my purpose are ferric chloride or nitrate, the chlorides of aluminum, tin or zinc, and the like.

The catalysts may be employed either in their naturally occurring crystalline form (provided such is of appropriate size) or as small pellets or granules. The latter can be made, for example, by grinding the contact material to a fine powder, dehydrating or drying sufficiently, if necessary, so that crumbling or disintegration will not take place when the material is subjected to temperatures required to effect cracking, and then pressing, for example, in a pelleting machine. In some cases the powder may be so dry that the mass, after subjection to a pressing operation, will not retain its shape. When this happens, a small proportion (say 1 or 2 per cent) of a binding agent or an assistant, e. g., water, may be incorporated into the finely ground mass and the latter then compressed into the desired shape by the application of pressure. In other instances when the contact material is present as small fine crystals, these may be pressed into any desired shape without prior grinding. The exact shape or configuration is not an essential part of my invention, the important point being that a large surface of the catalyst in the reaction chamber or cracking zone should come in contact with the hydrocarbon gases or liquids undergoing cracking.

Catalysts which are applicable for my purpose may be employed in either vapor-phase or mixed-phase cracking operations. In the former instance, preferably treatment is effected at atmospheric pressure, or substantially so. However, employment of higher or lower pressures is not precluded. In vapor-phase cracking, one or more reaction chambers (in which pyrolysis occurs) may be employed. The number required and their arrangement depend largely upon the type of petroleum distillate undergoing treatment. As an illustration, with a hydrocarbon stock which is readily amenable to pyrolysis, or thermal treatment, and contains only a small proportion of sulphur or other compounds which may exert a deleterious action on the catalyst, one reaction chamber may be sufficient to convert a large quantity of the higher-boiling liquids to those of lower-boiling points before the catalyst becomes so inactive as to render its regeneration necessary. However, in such cases it may be more desirable to have two such chambers arranged in parallel manner so that the hydrocarbon vapors can be passed through one while a fresh supply of contact material is being inserted into the other. In this manner a continuous pyrolytic operation can be maintained without interruption due to substitution of fresh or revivified catalyst for spent material.

In other instances it may be desirable to have several reaction chambers connected in series, in which case the hydrocarbon vapors, after passing through the first chamber, are submitted to fractional condensation, whereby the higher-boiling constituents are condensed to a liquid and thereby separated from the lower-boiling ones. The latter in turn can then be condensed to liquids boiling, for example, in the gasoline range. The condensate of higher-boiling fractions is then vaporized and conducted through the second reaction zone, whereby it is subjected to pyrolytic treatment. The products are subjected to separation by fractional condensation, as previously described, and the higher-boiling fraction subjected to a further cracking operation. Several cracking zones with intermediate fractionating operations may be employed of which one or more may be bypassed or removed from operation so as to allow substitution of inactivated catalyst by fresh or active material. For example, if the system should contain six units, as described above, then units 1, 2, 4 and 5 may be in actual operation while units 3 and 6 are being recharged with catalysts.

It should be understood that in such vapor-phase operations the catalysts, according to my invention, may of themselves furnish sufficient water to effect a requisite or desirable degree of isomerization or cracking of the oil molecules. However, in some cases it may be preferable to admix or simultaneously introduce a small quantity of water or steam with the hydrocarbons undergoing treatment. This can be done, of course, in any convenient manner prior to entrance of the feed stock into the reaction chambers or zones.

As previously mentioned, mixed-phase cracking may be employed. Such type of pyrolysis is particularly applicable when the petroleum distillate is not completely vaporized at atmospheric, or sub-atmospheric, pressure, at temperatures suitable for conducting hydrocarbon vapors over contact agents to effect cracking. In mixed-phase procedures the liquid hydrocarbons under pressure (which may be as high as 1000 pounds per square inch or greater) are subjected to the action of heat, and afterwards the lower-boiling fractions resulting therefrom are separated by reducing or releasing the pressure. In one type of operation, petroleum hydrocarbons are passed through a heated coil where they attain a temperature, say, of 800° or 900° F. and then into a drum or other container (often designated soaking drum) where they remain at the same or slightly lower temperature until the desired degree of pyrolysis is attained. The pressure required will depend upon the petroleum fraction undergoing treatment, the temperature employed and duration of the period of cracking. As previously mentioned, pressures of several hundred pounds or more are often used. From the soaking drum the liquid is led through a pressure-reducing mechanism into a fractionating tower in which the lower-boiling hydrocarbons are removed (as one or more fractions) and from which the higher-boiling or residual portion then is returned to the cracking zone or withdrawn from the system.

In such cracking operations, catalysts according to my invention may be suspended or dispersed in finely divided state or condition throughout the oil before it is subjected to the action of heat. Continual movement of the liquid through the coil may be sufficient to maintain the solid contact agent in suspension. In the soaking drum some catalyst may be rendered inactive and retained by the coke formed therein but from which it may be extracted with water. Any entrained and inactive catalyst passing into the fractionating tower will remain admixed with the residual non-distilling liquid. Methods of separating the inactive catalyst from such non-volatile hydrocarbons include filtration, which may be preceded by dilution of the liquid residue with a less viscous petroleum fraction.

It should be noted that by the term inactive or inactivated catalyst I do not mean the material has lost its inherent qualities of effecting cracking or isomerization of the oil molecules, but rather that the catalyst has become so coated with carbon or carbonaceous material that it can no longer function properly. That is, an undesirable surface coating prevents intimate contact of the contact agent and hydrocarbon molecules. To regenerate or reactivate the contact material, it is added, for example, to a sufficient volume of hot water, whereby complete solution, except of the carbonaceous and/or oily coating, is effected. The undissolved portion can then be removed by filtration, by decantation of the clear solution, or by any other convenient means. The hot solution afterwards is cooled and the solute recovered therefrom by crystallization. If desired, the inactivated material may be extracted with cold water, the insoluble portion removed, and the solute recovered by concentrating the solution at low temperatures and under reduced pressure. Other modifications of this general procedure, of course, are possible.

The figure is a diagrammatic showing of a suitable apparatus in which my process may be carried out. In the drawing, 1 is a cracking furnace containing reaction chamber 2, which is filled with small lumps of catalyst 3. Hydrocarbon gases enter the reaction chamber by means of pipe 4, and the products of cracking leave through exit 5. Means are not shown for heating the cracking furnace, for vaporizing hydrocarbons, or for conducting, for example, the products of cracking to a condensing apparatus or to another cracking furnace. Such means form no part of this invention.

By filling the branched tube 6 with small lumps of catalyst and opening the gate 7 which is actuated by the handle 8, the reaction chamber can be filled with the contact agent. During cracking operations the gate 7, of course, will be closed, as shown in the drawing. After cracking has been effected for an appropriate period of time or the activity of the catalyst has diminished, the latter is removed from the reaction chamber 2 by withdrawing the moveable support 9 by means of handle 10. The solid material falls through conduit 11 onto the screw conveyer 12 which (after the gate 13 is opened with the aid of handle 14) transfers the spent catalyst to the digester 15. Although only one catalytic unit is shown (in the drawing) as attached to the conveyer, it is possible that the latter may serve for several such units.

In digester 15 the spent catalyst is extracted thoroughly with hot water (or a dilute aqueous solution from a previous operation) and then allowed to settle. Heating of the liquid in digester 15 may be accomplished with the aid of heating coils or any other convenient manner. The clear, hot, concentrated solution is withdrawn through valve 16 and pipe 17 and passes through valve 18 into the heat exchanger 19 in which it is cooled. During this cooling operation a considerable proportion of the catalyst crystallizes from solution, thus furnishing a slurry which can be pumped through valve 20 and pipe 21 into filter press 22, where separation of solid and liquid portions is accomplished. The solid, recrystallized catalyst may be used again as such, or if desired, it may be subjected to a drying operation.

The aqueous liquid solution from filter press 22 is conducted then through valve 23, pipe 24, valve 25 and pipe 26 into the vacuum drier 27. Solid, recovered catalyst from the drier may be transferred directly to the cracking unit and reused. Water vapor from drier 27 passes through pipe 28 and condenser 29 and from these as a liquid through pipe 30 and valve 31 into storage tank 32.

The liquid from storage tank 32 then passes through valve 33 and pipe 34 into heat exchanger 19, where its temperature is raised by the hot, concentrated solution of recovered catalyst. From the heat exchanger 19 the liquid flows through pipes 35 and 36 into heater 37 where its temperature, if necessary, may be increased further.

An optional method of conducting liquid from storage tank 32 comprises closing valve 33 and opening valve 38, whereby direct connection is established between tank 32 and heater 37.

From heater 37 the hot extraction liquid flows through valve 39, pipe 40 and valve 41 into digester 15, where extraction of spent catalyst is effected.

There will be an accumulation eventually in digester 15 of matter insoluble in water, e. g., coke, entrained oil, etc. Some of these insoluble bodies may be heavier than the aqueous solution of catalyst and settle on the bottom of digester 15 as a sludge. In which case, such sludge can be withdrawn through valve 42, pipe 43, valve 44 and pipe 45. In some instances practically no sludge will be formed. It is then possible to withdraw the hot concentrated aqueous solution of catalyst through valve 42 and pipe 43 into pipe 17, which connects directly with heat exchanger 19. On the other hand, insoluble material which is lighter than the aqueous solution of catalyst (e. g., coke) may be withdrawn in any convenient manner through door 46.

Water may be introduced into the regenerative system through pipe 47 and valve 48. A large proportion of this liquid will be required when regeneration of spent catalyst is put into operation for the first time. Afterwards the addition of only minor proportions will be required to make up loss due to evaporation, etc.

Regenerative methods for cracking catalysts often comprise burning off, oxidizing, or otherwise eliminating the carbonaceous coating by treatment of the contact material at high temperatures with steam, for example, which may or may not be admixed with oxygen or with air or other oxidizing gases. Such procedures, however, may result in some change in composition of the catalytic surface (other than merely removing the carbonaceous coating). Such changes, even though small, could exert, nevertheless, profound and unusual effects on the catalytic activity of the contact agent and in turn on the yield and character of the hydrocarbon product.

By employing water-soluble catalyst and effecting regeneration or reactivity by dissolving the same in water and recrystallizing therefrom, the composition of the catalyst and therefore its activity can be maintained substantially constant. This particular feature of maintaining the catalyst composition substantially constant I consider as being of unusual and most necessary importance.

It should be noted that the cracking and regenerative operations, as described above, can be combined to form one continuous and non-cumulative process. Thus, vapor-phase cracking may be effected without any interruption in operation (as previously mentioned) by employing several reaction zones simultaneously, some of which are in actual use and others are being renovated. At the same time the inactive catalyst is being regenerated, by recrystallization as disclosed, and the reactivated material then charged into a non-operating reaction zone. As the contact agent is being continually used, removed from the reaction zone, regenerated, replaced in said zone and reused, I call it a catalyst in motion.

In vapor-phase cracking operations, involving the use of catalysts according to my invention, the liquid charging stock is conducted first through a preheater (of suitable design) which is maintained at a temperature sufficiently high to effect substantially complete vaporization. The vapors then pass through the reaction chamber, which is filled with catalyst and maintained at an appropriate temperature. The ensuing gases are cooled and the liquid product distilled to furnish gasoline or other fractions. When the catalyst becomes sufficiently inactive, the particular unit (or units) may be by-passed and the contact agent removed therefrom and subjected to a regenerative operation.

The following examples will illustrate the use of water-soluble catalysts according to my invention.

*Example 1.*—Gas oil, having an initial boiling point of 223° C., 60 per cent distilling up to 300° C. and 90 per cent distilling over at 360° C., was fed into a preheating coil maintained at a temperature of 850° to 860° F. The feed rate in this instance was equivalent to about 0.6 volume of liquid to 1 volume of catalyst-filled space per hour. The vapors from this coil were conducted through a catalyst chamber which had been filled with sodium pyrophosphate ($Na_4P_2O_7 \cdot 10H_2O$) and then maintained at a temperature of 890° to 910° F. The catalyst was present in the form of small solid crystalline particles so as to present a large surface area to the hydrocarbon gases undergoing treatment. The duration of pyrolysis was 85 minutes. The resulting products of cracking afterwards were passed through cooling means and the liquid thereby obtained distilled for gasoline content (portion boiling up to 204° C.) and for portion boiling up to 300° C. It was found that gasoline content was 8 per cent, and this fraction had an aniline point of 66° F. It was observed, also, that 71 per cent of the liquid product distilled up to 300° C.

The aniline point was ascertained by mixing equal volumes of gasoline and aniline, heating or cooling the mixture, as the case might be, and noting the temperature at which miscibility of the liquids just occurs. In other words, at temperatures above this value the two liquids are completely miscible, while at temperatures below this value partial or complete immiscibility takes place. The lower the aniline point, the greater is the proportion of those constituents (e. g., olefins aromatics and naphthenes) of a gasoline which increase its antiknock value.

As mentioned above, the catalyst (hydrated sodium pyrophosphate) was employed as small solid crystalline masses. Although some water was driven off during heating of this salt to the temperature of pyrolysis, nevertheless it was also noted that the cracking products were admixed with a substantial proportion of water. This indicated that the catalyst was slowly giving up some of its water of crystallization even at cracking temperatures. The aqueous liquid was separated from the products of cracking before the latter were subjected to distillation for gasoline content.

This procedure, separation of cracked distillate and water, was employed in all the following examples in which hydrocarbon and aqueous layers were obtained as a result of cracking operations.

*Example 2.*—A portion of the same gas oil was subjected to cracking, as described in Example 1, except the reaction chamber was not filled with catalyst. In this instance the yield of gasoline amounted to 5 per cent, and the total yield of liquid boiling up to 300° C. was 69 per cent. The aniline point of the gasoline fraction was 81° F.

It should be noted that the yield of gasoline was less when no contact agent was employed and also that the aniline point was higher. The latter value may be taken to indicate that the catalytically cracked gasoline possessed a higher antiknock value.

*Example 3.*—That fraction of the feed stock which boiled between 220° and 300° C. (after washing with dilute aqueous caustic soda to eliminate any dissolved hydrogen sulphide) was found on analysis to be 0.738 per cent sulphur. An analogous distillate (boiling 204° to 300° C.) from the liquid product secured in Example 1 (after washing with dilute aqueous caustic soda to eliminate any dissolved hydrogen sulphide) was found on analysis to contain 0.616 per cent sulphur. These results indicate the sulphur-reducing, as well as the cracking or isomerization, action of sodium pyrophosphate when employed as a contact agent in the pyrolysis of petroleum distillates.

*Example 4.*—At the end of the time period mentioned in Example 1 the cracking unit was cooled and the contact agent discharged therefrom. For the most part it was dark-colored and covered with a black carbonaceous layer and also some adhering oil. The catalyst mass was added to the requisite quantity of heated water to effect solution of the soluble portion thereof. The carbonaceous material and oily portion readily separated and could be substantially removed by filtration. The hot aqueous filtrate was allowed to cool, whereupon the solute (or catalyst) crystallized from solution. The liquid portion was filtered, concentrated by heating and then cooled, thus furnishing another mass of regenerated crystalline catalyst. After drying to eliminate adhering water, the reactivated mass was ready for use and could be employed as such or ground to a fine powder and the latter pressed into any desired shape or form.

*Example 5.*—The same type of gas oil previously employed was subjected to a cracking operation, as described in Example 1, except that sodium tungstate ($Na_2WO_4 \cdot 2H_2O$) was the catalytic agent. The latter consisted of small solid crystalline masses. In this instance the liquid product on distillation yielded 13 per cent gasoline and 72 per cent distilling up to 300° C. The aniline point of the gasoline was 65.5° F. In this case, as well as in all others in which a water-soluble, hydrated salt was the catalyst, some water was admixed with the liquid cracking product. As previously mentioned, the aqueous portion was removed before the hydrocarbon liquid was distilled for gasoline content.

*Example 6.*—The inactive catalyst from Example 5 was added to sufficient hot water to effect solution of all soluble material. After removal of insoluble portion, the clear hot filtrate was allowed to cool and crystallization of the sodium tungstate to take place. The crystals, which in this instance were rather small in size, were separated from the concentrated aqueous solution and dried by exposure to the atmosphere. Further concentration of the aqueous solution, followed by crystallization, furnished an additional yield of regenerated catalyst. The two masses of salt (which were air-dried) were mixed, pressed into the form of small discs by the application of pressure (1500 to 2500 pounds per square inch), and were then ready to be employed as contact agents for cracking operations.

*Example 7.*—The discs of regenerated or recovered catalyst, from Example 5, were broken into smaller pieces and the latter employed in a cracking operation as disclosed in Example 1. In this particular instance, however, the preheating temperature was maintained at 800° to 810° F., and the feed rate of charging stock (same as employed in Example 2) was equivalent to about 0.45 volume of liquid to 1 volume of catalyst-filled space per hour. The liquid product from the cracking operation yielded on distillation 18 per cent of gasoline, having an aniline point of 63° F., and 72 per cent distilling up to 300° C.

*Example 8.*—Sodium molybdate $$(Na_2MoO_4 \cdot 2H_2O)$$

which was in the form of a fine powder, was pressed into the shape of small discs by the application of 1500 to 2500 pounds pressure. The discs were further broken into small pieces, and these were employed as contact material for catalytic cracking. In this instance the feed stock was similar to that used in Example 2, the feed rate was approximately 0.6 volume of liquid to 1 volume of catalyst-filled space per hour, the preheating temperature 800° to 810° F., and the cracking temperature 890° to 910° F. The liquid product, on distillation, was found to contain 13 per cent of gasoline and 71 per cent of liquid boiling up to 300° C. The aniline point of the gasoline was 55° F.

*Example 9.*—The spent catalyst from Example 7 was extracted with hot water, the insoluble portion removed, and the aqueous solution concentrated and cooled. In this manner sodium molybdate was recovered in a finely divided crystalline mass. After separation of the latter, the clear liquid solution was concentrated further, cooled, and an additional mass of fine crystals secured. The two masses of material were air-dried, mixed and pressed into small discs. These were employed as cracking catalyst, as described in Example 8, the gasoline produced in this case having an aniline point of 64° F.

*Example 10.*—Potassium aluminum sulphate (potassium alum) was partially dehydrated by heating for a short time at 300° C. The resulting mass was broken into small solid particles and the latter employed in the vapor-phase catalytic cracking of gas oil (using procedure described in Example 1).

In this latter operation, the gas oil was fed at the rate of about 0.6 volume of liquid per volume of reaction zone per hour, the preheater was maintained at a temperature of 790° to 800° F., and the cracking zone at a temperature of 890° to 910° F. The liquid product on distillation yielded 10 per cent of gasoline (boiling up to 204° C.) and 75 per cent of hydrocarbons boiling up to 300° C. The aniline point of the gasoline was 73° F.

A substantial proportion of water was observed in the liquid product, indicating the alum was not completely dehydrated prior to its use as a catalyst and that water was being liberated slowly during the cracking operation.

Under analogous operating conditions, but in the absence of the contact agent, the liquid product contained 5 per cent of gasoline having an aniline point of 81° F.

*Example 11.*—Spent catalyst from Example 10 was ground to a fine powder, extracted with hot water and the insoluble portion removed. The aqueous extract was concentrated and the regenerated catalyst recovered by crystallization from solution.

With this type of contact agent somewhat more rapid aqueous extraction can be accomplished if the water be slightly acidulated (say, 1 per cent or less) with sulphuric acid.

*Example 12.*—Finely ground anhydrous potassium sulphate was incorporated with 2.5 per cent its weight of water and the resulting powder was pressed into the shape of round discs by the application of pressure, 2000 lbs. per sq. in. The discs were cut into small pieces and the latter employed as catalyst for the cracking of gas oil, as described in Example 1. In this instance, however, the preheating temperature was 810° to 820° F., and the cracking temperature was 840° to 860° F. The feed rate of gas oil was 0.4 volume per volume of catalyst per hour. The duration of pyrolysis was 125 minutes. The liquid product contained 5 per cent of gasoline, having an aniline point of 84° F., and 71 per cent of liquid hydrocarbons boiling below 300° C.

*Example 13.*—The spent catalyst from the preceding example was extracted with hot water, the insoluble carbonaceous material separated by filtration, and the hot filtrate allowed to cool, whereupon potassium sulphate separated as crystals from the aqueous solution. The latter then was concentrated by heating, and on cooling this concentrated solution an additional supply of the sulphate was secured. The two batches of potassium salt were mixed, ground to a fine powder and the latter then incorporated with 2.5 per cent its weight of water. The resulting powder was pressed into round discs as described in Example 12.

*Example 14.*—The catalyst, as prepared in Example 13, was employed in the vapor-phase cracking of gas oil. During this operation, water equal to 4 per cent of the volume of oil was fed simultaneously with the latter into the preheating zone, which was maintained at a temperature of 810° to 820° F. The mixture of oil and water vapors were passed from the preheater into the reaction chamber, which was filled with potassium sulphate catalyst and heated to a temperature of 840° to 860° F. The feed rate of the gas oil was 0.4 volume per volume of catalyst per hour and the duration of the cracking operation 125 minutes. In this instance the yield of gasoline was 14 per cent and that of liquid hydrocarbons boiling below 300° C. was 76 per cent. The gasoline had an aniline point of 53° F.

When the mixture of gas oil and water was cracked under analogous conditions, but in the absence of the catalyst, the yield of gasoline was 10 per cent and that of hydrocarbons boiling below 300° C. was 70 per cent. The aniline point of the gasoline was 119° F.

From the foregoing it will be seen that my invention contemplates cracking petroleum hydrocarbons in the presence of a water-soluble inorganic salt as a catalyst. The latter may be selected from the class of anhydrous, or substantially anhydrous, salts or from the type which slowly liberates or evolves some water of crystallization at cracking temperatures so that within the cracking zone there will be a mixture of hydrocarbon molecules and water molecules. The catalyst also comprises those substances which appear to be substantially unaltered in composition, except for the loss of water of crystallization, during the preheating and cracking operations. As a result, the catalysts are readily regenerated.

Regeneration or reactivation can be accomplished by dissolving the water-soluble contact agent, after it has been employed in a cracking operation and its surface become coated with carbon and/or carbonaceous material, followed by separation and removal of insoluble material and recrystallizing the solute or catalyst from solution. These steps form an essential feature involving the use of catalysts, according to my invention, and are carried out as a continuous process in conjunction with the actual cracking operation. Thus, the petroleum hydrocarbons, in vapor form, can be conducted into a reaction chamber heated to the appropriate temperature and filled with the contact agent, and cracking effected. When the catalyst becomes inactive due to a coating of coke or products of cracking which act as an insulating or inhibitory covering, the hydrocarbon vapors are conducted through another reaction zone. The inactive catalyst then can be discharged from the non-operating zone, dissolved in water, separated from insoluble material, recrystallized, dried and again placed in a reaction chamber. Since the catalysts are continually going through a non-cumulative cycle involving their use, inactivation, regeneration or reactivation, and reuse, I designate these agents as catalysts in motion, as previously indicated.

The employment of such contact materials not only enables me to effect a greater degree of cracking or pyrolysis than would be obtained by thermal treatment alone, but also to secure gasolines of improved or enhanced antiknock value. The optimum conditions for such results, e. g., time of contact in the cracking zone, rate of feed, temperature employed, will vary somewhat with the individual contact material and with the character of the petroleum hydrocarbons undergoing pyrolysis. Furthermore, cracking in the presence of water-soluble catalysts, suitable for my purpose, often results in a reduction of the sulphur content of the hydrocarbon distillate, or fractions thereof. This is particularly the case when the proportion of sulphur in the feed stock, or hydrocarbons undergoing pyrolysis, is high. My invention, therefore, includes, in some cases, the securing of cracked distillates of decreased or reduced proportion of sulphur and/or sulphur-bearing compounds.

I do not wish to imply that the hydrated salts suitable for my purpose lose water of crystallization only on being heated to cracking temperatures. In fact, some of the salts do give up a very substantial proportion of water and become partially dehydrated at much lower temperatures, and in some cases complete dehydration may be effected if the materials are ground to a fine powder and the latter submitted to mild heating. However, such salts as I find applicable for my invention when employed in a massive or pressed or compact form do appear to retain tenaciously some water of crystallization and to release it slowly at cracking temperatures. Furthermore, if the quantity of water liberated by the catalyst should prove insufficient for the desired or required isomerization or cracking of the hydrocarbon molecules present in the particular distillate at hand, then additional water or steam can be admixed with the distillate (or its vapors) before the latter come into contact with the catalyst.

The water-soluble catalysts, if desired, may be supported on porous materials such as pumice and the like which remain substantially unaltered in composition at high temperatures. This may be accomplished, for example, by impregnating the porous material with a concentrated aqueous solution of the catalyst and then drying the catalyst-coated support. After the latter has been employed in a cracking operation, the water-soluble catalyst may be recovered by extraction with water and recrystallization therefrom. Any coke or carbonaceous bodies which remain adhering to the supporting material may be removed by burning or by any other suitable manner. However, in the preferred form of my invention the use of a catalyst support is avoided.

Although the inactivated catalysts may be recovered or regenerated and employed again in pyrolytic operations, as previously described, nevertheless in some instances it may be desirable as an alternative to utilize the inactivated mass as a plant-fertilizing composition. Such utilization would be particularly applicable when pyrophosphates or other phosphates were employed as contact agents. When such is the case, the inactive mass may be extracted (if necessary) with naphtha or other suitable solvent to remove any considerable proportion of entrained tarry or liquid petroleum hydrocarbons which may be toxic to plants. The resulting mixture of water-soluble salt and solid carbonaceous material then can be ground and employed as such as a plant-fertilizing material. Or it may be admixed with appropriate quantities of nitrogen-containing compounds (for example, ammonium sulphate, calcium nitrate) and/or potassium-containing substances (e. g., potassium chloride or sulphate) to furnish a mixed fertilizer.

I do not wish to limit my invention to the utilization of an individual water-soluble catalyst (e. g., sodium tungstate) during the cracking operation. Two or more such agents may be employed when vapor-phase pyrolysis is effected (as previously described) with the aid of several reaction chambers in series. Thus, the first reaction chamber may be filled with potassium sulphate and the second one with sodium pyrophosphate. On the other hand, a mixture of water-soluble catalysts may be used in either vapor-phase or mixed-phase operation. For example, I may grind to a fine powder equal parts by weight of sodium tungstate and sodium molybdate, subject the powder to a pelleting operation, and use the resulting small solid masses as contact material. After pyrolysis, the spent catalyst can be extracted with water (as previously noted) and the salts recrystallized therefrom in admixture with one another. Or, in other instances, when solubility permits, fractional crystallization of the salts from aqueous solution may be effected.

By the term mixed-phase cracking, as used herein, is meant those operations involving the use of pressures substantially greater than atmospheric pressure. In such operations the petroleum hydrocarbons are present in both liquid and vapor states, though probably to a greater proportion in the liquid state as the applied pressure is increased.

From the foregoing it will be evident that, if desired, the entire procedure of cracking and isomerization, including the step of catalyst restoration (usually to one showing a greater facility of conversion than the original material) may be carried out as a continuous or non-cumulative process.

Also, when a soaking drum forms a part of the cracking and isomerization equipment, and a catalyst of fertilizing properties is used, then any coke formed in the soaker, or otherwise, may be used as a fertilizing stock to the extent desired.

Further, it should be understood that the examples given are purely illustrative, and that yield and quality of the gasoline obtained are likely to be considerably modified and improved in operations on a larger scale.

What I claim is:

In a process in which higher boiling petroleum hydrocarbons in vapor form are cracked in the presence of a solid water-soluble inorganic salt as a catalyst at a cracking temperature of about 850° F. to 910° F. to produce lower boiling hydrocarbons until the catalyst becomes inactive due to deposits of water-insoluble carbonaceous material, the catalyst being in solid form when first contacted with the hydrocarbon vapors and being substantially stable, non-fusible and non-volatile at the cracking temperature, the steps of regenerating the inactive catalyst which comprise mixing the inactive solid catalyst in a liquid medium consisting essentially of hot water to dissolve the water-soluble catalyst without dissolving the carbonaceous material, removing undissolved carbonaceous material, cooling the clear solution and recrystallizing the catalyst from the water solution, the catalyst being one which does not undergo any substantial hydrolysis when contacted with water.

CARLETON ELLIS.